May 25, 1926.
C. C. FARMER
FREIGHT BRAKE EQUIPMENT
Filed May 27, 1925
1,585,774
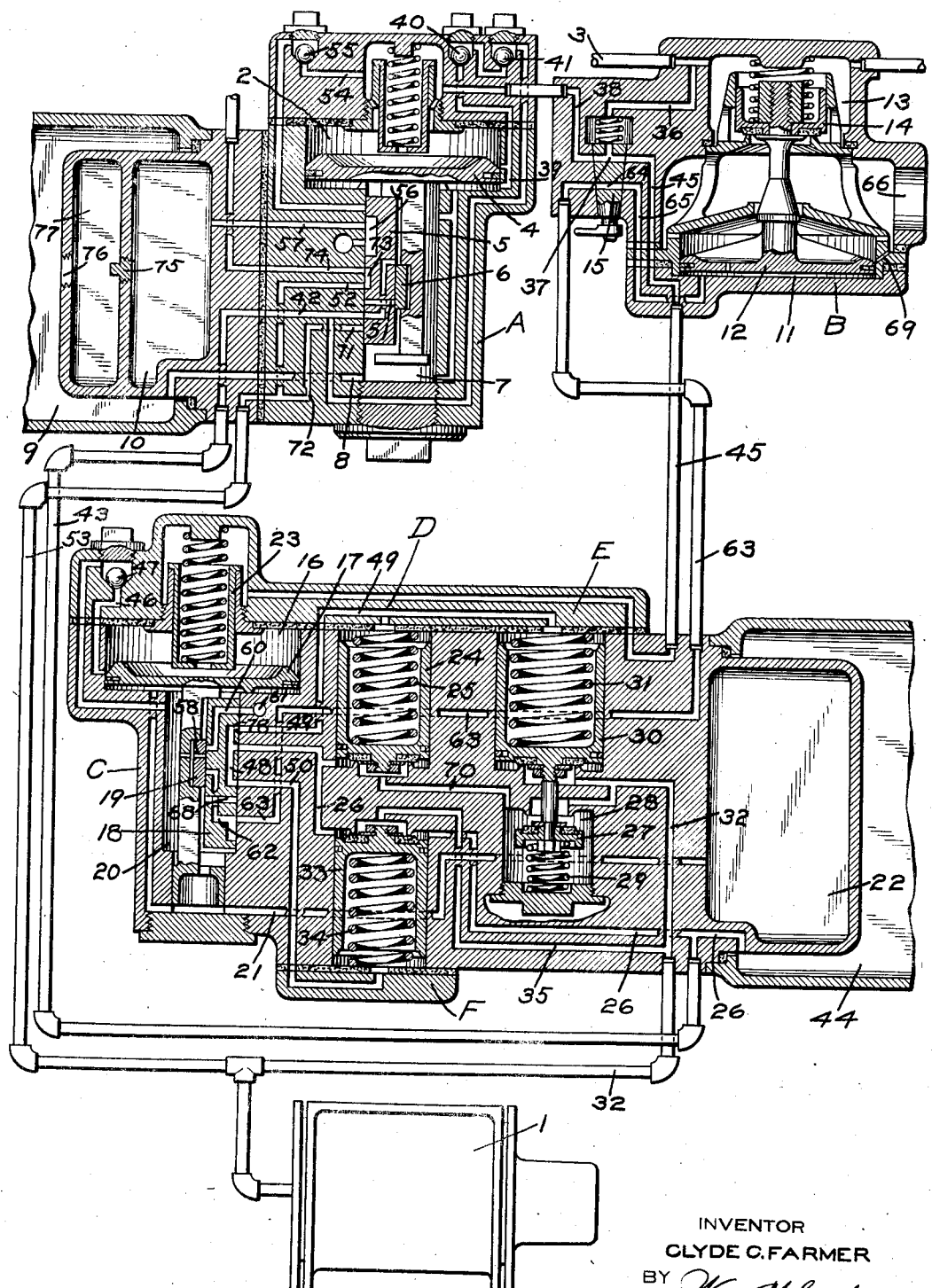
INVENTOR
CLYDE C. FARMER
BY Wm. M. Cady
ATTORNEY Patented May 25, 1926.

1,585,774

UNITED STATES PATENT OFFICE.

CLYDE C. FARMER, OF PITTSBURGH, PENNSYLVANIA, ASSIGNOR TO WESTINGHOUSE AIR BRAKE COMPANY, OF WILMERDING, PENNSYLVANIA, A CORPORATION OF PENNSYLVANIA.

FREIGHT BRAKE EQUIPMENT.

Application filed May 27, 1925. Serial No. 33,152.

This invention relates to fluid pressure brakes and more particularly to a brake equipment, which functions to control the rate of build up of brake cylinder pressure during an emergency application.

The principal object of my invention is to provide an improved brake equipment having means for supplying an initial inshot of fluid under pressure to the brake cylinder of sufficient degree to move the brake cylinder piston outwardly so as to bring the brake shoes up against the wheels, followed by a slow build up of brake cylinder pressure during a time interval of sufficient duration, to permit the brakes to be gradually applied throughout the train, so that while the brakes are applied throughout the train, the force of the brake application is not so heavy as to cause severe shocks, which would otherwise occur, due to the running in of the slack. After the brake cylinder pressure has been gradually built up to a predetermined degree, a final inshot of fluid under pressure is supplied to the brake cylinder in order to provide the desired high degree of brake cylinder pressure in an emergency application of the brakes.

In the accompanying drawing, the single figure is a diagrammatic sectional view of a brake equipment embodying my invention.

As shown in the drawing, the equipment may comprise a brake cylinder 1, a service application valve device A, a quick action valve device B, an emergency application valve device C, an initial inshot valve device D, a cut off valve device E and a final inshot valve device F.

The service application valve device A may comprise a casing, having a piston chamber 2 connected to the brake pipe 3 and containing a piston 4, a main slide valve 5 and an auxiliary slide valve 6 operable by the piston 4 and contained in a valve chamber 7, which is connected by a passage 8 to a service reservoir 9 provided in the casing. Also provided in the casing is a quick service chamber 10.

The quick action valve device B may comprise a casing having a piston chamber 11 containing a quick action piston 12 and a valve 14 operatively connected to piston 12 and contained in a valve chamber 13, which is open to the brake pipe 3. Also contained in the quick action valve device casing is a manually operated cut-out cock 15, which is adapted to control communication through the passages by which fluid under pressure is supplied to piston chamber 11 and also to the service and emergency application valve devices A and C.

The emergency application valve device C may comprise a casing, having a piston chamber 16 connected to the brake pipe 3 and containing a piston 17, which is adapted to operate a main slide valve 18 and an auxiliary slide valve 19 contained in a valve chamber 20, said valve chamber being connected by a passage 21 to the quick action chamber 22. A spring pressed stop 23 is provided in the casing and functions to define service position of the piston 17.

The initial inshot valve device D may comprise a valve piston 24 subject on one side to the pressure of a coil spring 25 and on the other seated area of the opposite side to the pressure of fluid in the emergency reservoir 44 as supplied through passage 26.

The cut off valve device E may comprise a valve 27 contained in a valve chamber 28 and subject to the pressure of a coil spring 29 and a valve piston 30 operatively connected to the valve 27 and subject on one side to the pressure of a coil spring 31, while the inner seated area of the opposite side is open to the brake cylinder through passage and pipe 32.

The final inshot valve device F may comprise a valve piston 33 subject on one side to the pressure of a coil spring 34, on the outer seated area of the opposite side to the pressure of fluid in the emergency reservoir, as supplied through passage 26, and on the inner seated area to the pressure of fluid in the brake cylinder 1 as supplied through pipe and passage 32 and passage 35.

In operation, fluid under pressure from the brake pipe 3 flows through passage 36, port 37 in cut-out cock 15, passage and pipe 38 to piston chamber 2 of the valve device A, forcing the piston 3 to its innermost position. From piston chamber 2 fluid flows through passage 39 to valve chamber 7, thence through passage 8 to the service reservoir 9, charging the same. Fluid from piston chamber 2 also flows through passage 39, past ball check valves 40 and 41, thence through passage 42, pipe 43 and passage 26, to the emergency reservoir 44, charging the same.

Fluid from the brake pipe 3 is also supplied through passage 36, port 37 in cut-out cock 15, passage and pipe 45 to piston chamber 16 of the emergency valve device C, where it acts to shift the piston 17 to its innermost position. Fluid from piston chamber 16 flows through passage 46 past ball check valve 47 to valve chamber 20, thence through passage 21 to quick action chamber 22, charging said chamber.

Fluid from the emergency reservoir 44 is supplied through passage 26, to the outer seated areas of the valve pistons 24 and 33 of valve devices D and F respectively, and when piston 17 and slide valve 18 are in release position as shown in the drawing, through cavity 48 in said slide valve and passage 49 to the spring side of valve pistons 24 and 30, also through said cavity and passage 50 to the spring side of valve piston 33. The pressure of fluid supplied as just described, together with the pressure exerted by their respective springs acts to seat the valve pistons 24, 30, and 33, and the seating of valve piston 30 serves to unseat the valve 27 so that valve chamber 28 is open to passage 32.

When it is desired to effect a service application of the brakes, the pressure in the brake pipe 3, and consequently in piston chamber 2 of valve device A, is reduced in the usual manner. The reduction of pressure in piston chamber 2 causes the piston 4 and consequently slide valves 5 and 6 to be shifted to service position.

In this position of said slide valves the usual service port 51 is uncovered and registers with a passage 52 so as to supply fluid from valve chamber 7 and the service reservoir 9 to the brake cylinder 1 by way of port 51, passage 52, and pipe 53.

With slide valve 5 in service position, fluid from the piston chamber 2 and the brake pipe 3 is vented to the quick service chamber 10, by way of passage 54, past ball check 55, cavity 56 in slide valve 5 and passage 57, so as to effect a local reduction in brake pipe pressure and then quickly propagate the service action throughout the train.

The reduction of pressure in the brake pipe 3, at a service rate, causes the piston 17, of the emergency valve device C, to be shifted outwardly until it engages the stop 23. The movement of the piston 17 shifts the slide valve 19 to a position so as to connect the valve chamber 20 and consequently quick action chamber 22 to atmosphere by way of port 58 in slide valve 19, port 60 in slide valve 18 and atmospheric exhaust port 61. When the pressure in the valve chamber 20 and quick action chamber 22 has been reduced slightly below the pressure in the brake pipe 3 and piston chamber 16, the higher pressure acting on the outer face of piston 17 will shift said piston to its innermost position, with a consequent movement of slide valve 19 to release position, thereby preventing an emergency application of the brakes.

When an emergency application of the brakes is initiated by effecting a sudden reduction of pressure in the brake pipe 3 and consequently in piston chamber 2 of valve device A and piston chamber 16 of valve device C, the higher pressure in valve chambers 7 and 20, acting on the opposite side of respective pistons 4 and 17, will shift said pistons to emergency position.

The piston 17 in moving to emergency position shifts the slide valves 18 and 19 to a position in which the valve chamber 20, and consequently quick action chamber 22, is connected to piston chamber 11 of the quick action valve device B, by way of port 62 in slide valve 18, passage and pipe 63, port 64 in cut-out cock 15, and passage 65. The fluid under pressure so supplied from the quick action chamber 22 acts to shift the piston 12 so as to unseat valve 14 and vent fluid from valve chamber 13 and the brake pipe 3 to atmosphere by way of atmospheric exhaust port 66, thereby causing a quick serial venting of the brake pipe throughout the train.

With slide valve 8 in this position, the spring side of each of the valve pistons 24 and 30 of valve devices D and E respectively, is connected to atmosphere by way of passage 49, cavity 48 and atmospheric exhaust port 61. The spring side of valve piston 33 of valve device F is connected by a port 68 to valve chamber 20, which in this position of slide valve 18 is connected to quick action piston chamber 11 and thence to atmosphere by way of port 62, passage and pipe 63, passage 69, and atmospheric exhaust port 66.

The venting of fluid from the spring side of valve piston 24 permits the pressure of fluid from the emergency reservoir acting on the outer seated area of the opposite side to unseat said valve piston and permit fluid from the emergency reservoir to flow to the brake cylinder by way of passage 26 past unseated valve piston 24, passage 70 to valve chamber 28. past unseated valve 27, and through passage and pipe 32.

Fluid continues to flow to the brake cylinder as just described so long as the valve 27, which is controlled by valve piston 30, remains open. The valve piston 30, the inner seated area of which is exposed to the pressure of fluid in the brake cylinder through pipe and passage 32, remains seated, holding valve 27 open until the pressure in the brake cylinder 1 becomes sufficient, such for example as ten pounds, to unseat said valve piston against the pressure exerted by spring 31. The unseating of valve piston 30 acts to seat the valve 27 and thereby prevent further flow of fluid from the emergency reservoir to the brake cylinder.

Since the piston 4 of the valve device A has moved to emergency position, as hereinbefore described, the slide valves 5 and 6 have also been shifted to emergency position, so that fluid from the service reservoir 9 is supplied at a restricted rate to the brake cylinder by way of the uncovered passage 71, which is restricted at 72, passage 52 and pipe 53.

When fluid under pressure from the service reservoir, supplied as just described, has increased the pressure in the brake cylinder to a predetermined degree, such, for example, as twenty seven pounds, said pressure, which is supplied to the inner seated area of valve piston 33, by way of passage 35, will unseat the valve piston 33 and permit fluid from the emergency reservoir which, as hereinbefore described, is always present on the outer seated area of said valve piston, to flow past said unseated valve piston through passage 35 and pipe 32 to the brake cylinder 1, thereby supplying a final inshot of fluid under pressure to the brake cylinder.

When it is desired to release the brakes, the brake pipe pressure is increased in the usual way, which consquently increases the pressure of fluid in piston chambers 2 and 16 of the valve devices A and C respectively, so that the pistons 4 and 17 of said valve devices are shifted to their innermost positions. The shifting of the pistons 4 and 17 to their innermost positions act to move the respective slide valves 5 and 6, and 18 and 19, to release position, in which the brake cylinder is connected to atmosphere, by way of pipe 53, passage 52, cavity 73 and passage 74.

The double cut-out cock 15 is provided so that when it is desired to cut out the brake apparatus on one car of a train it may be effected by turning said cut-out cock to closed position, in which communication from the brake pipe 3 to piston chamber 2 of valve device A and piston chamber 16 of valve device C is cut off. The cut-out cock 15 also serves to cut off communication through pipe and passage 63, so that if the pressure of fluid in piston chamber 16 should be reduced by leakage or otherwise, causing the piston 17 and slide valve 18 to be shifted to emergency position, while the quick action chamber 22 is still charged, fluid therefrom will not be supplied through pipe and passage 63 to quick action piston chamber 11, so as to cause an unintended emergency application of the brakes to be effected through the train.

An additional chamber 77 may be provided, adjacent to chamber 10, and having the wall intermediate the chambers provided with a threaded opening 76 so that on cars having a large brake pipe volume, the volume of quick service chamber 10 may be increased to correspond by merely changing the plug 75 to the threaded opening 76.

On a heavily loaded train, it is frequently the custom to employ a higher standard brake pipe pressure than on a lightly loaded train, and with a loaded train it is desirable that the initial inshot be of greater extent than on a light train.

If the venting of fluid from the valve piston 30 is at such a rate that the movement thereof is practically instantaneous, the extent of the initial inshot would be substantially the same, regardless of the brake pipe pressure carried on the train.

In order to ensure an initial inshot of greater pressure when a high brake pipe pressure is carried, the venting of fluid from the valve piston 30 is made gradual, by providing a restricted portion such as the choke 78, in the cavity 48, through which fluid is vented from the valve piston 30.

By this means, when a high brake pipe pressure is carried, a slightly longer time is required to vent fluid from the valve piston 30 than when a lower brake pipe pressure is carried, with the result that the valve 27 remains open a slightly longer period and thus permits an inital inshot of greater pressure before the valve 27 is closed by operation of the valve piston 30.

The gradual venting of fluid from valve piston 30 is also of advantage in case an emergency application is effected following a service application, since the delay in the operation of the valve piston 30 to effect the closure of valve 27 permits a certain amount of flow to the brake cylinder, even though the pressure built up in the brake cylinder in the service application should be equal to or exceed the brake cylinder pressure required to effect the operation of the valve piston 30.

Having now described my invention, what I claim as new and desire to secure by Letters Patent, is:—

1. In a fluid pressure brake, the combination with a brake pipe and a brake cylinder, of valve means for controlling the supply of fluid under pressure to the brake cylinder, an emergency valve device operated upon a sudden reduction in brake pipe pressure for operating said valve means, and a cut-off valve device operated upon a predetermined increase in brake cylinder pressure for closing communication through which said valve means supplies fluid to the brake cylinder.

2. In a fluid pressure brake, the combination with a brake pipe and a brake cylinder, of a fluid pressure controlled valve means for supplying fluid under pressure to the brake cylinder, and an emergency valve device normally supplying fluid to said valve means and operated upon a sudden reduction in brake pipe pressure for venting fluid from said valve means.

3. In a fluid pressure brake, the combination with a brake pipe and a brake cylinder, of valve means for supplying fluid under pressure to the brake cylinder, a cut-off valve device operated upon a predetermined increase in brake cylinder pressure for cutting off communication through which said valve means supplies fluid to the brake cylinder, and an emergency valve device operated upon a sudden reduction in brake pipe pressure for venting fluid from one side of said cut-off valve device.

4. In a fluid pressure brake, the combination with a brake pipe and a brake cylinder, of valve means for supplying fluid under pressure to the brake cylinder, a cut-off valve device operated upon a predetermined increase in brake pipe pressure for cutting off communication through which said valve means supplies fluid to the brake cylinder, and an emergency valve device normally supplying fluid under pressure to one side of said cut-off valve device and said valve means and operated upon a sudden reduction in brake pipe pressure for venting fluid from said cut-off valve device and said valve means.

5. In a fluid pressure brake, the combination with a brake pipe and brake cylinder, of valve means for controlling the supply of fluid under pressure to the brake cylinder, a cut-off valve device comprising a valve for controlling communication through which said valve means supplies fluid to the brake cylinder, a piston subject on one side to brake cylinder pressure for operating said valve, and an emergency valve device for normally maintaining fluid pressure on the opposite side of said piston and operated upon a sudden reduction in brake pipe pressure for venting fluid from said piston.

6. In a fluid pressure brake, the combination with a brake pipe and brake cylinder, of valve means for controlling the supply of fluid under pressure to the brake cylinder, a cut-off valve device subject on one side to brake cylinder pressure for controlling communication through which said valve means supplies fluid to the brake cylinder, and an emergency valve device operated upon a sudden reduction in brake pipe pressure for venting fluid from said cut-off valve device through a restricted port.

7. In a fluid pressure brake, the combination with a brake pipe, brake cylinder, and an emergency reservoir, of valve means for supplying fluid from said emergency reservoir to the brake cylinder, a valve device for also supplying fluid from said reservoir to the brake cylinder upon a predetermined increase in brake cylinder pressure, and an emergency valve device operated upon a sudden reduction in brake pipe pressure for effecting the operation of said valve means.

8. In a fluid pressure brake, the combination with a brake pipe, of a brake pipe vent valve device, an emergency valve device operated upon a reduction in brake pipe pressure for supplying fluid under pressure to said vent valve device for operating same to effect a local reduction in brake pipe pressure, and a cut-out cock for controlling communication through which fluid is supplied to said vent valve device.

9. In a fluid pressure brake, the combination with a brake pipe, of a brake pipe vent valve device, an emergency valve device operated upon a reduction in brake pipe pressure for supplying fluid under pressure to said vent valve device for operating same to effect a local reduction in brake pipe pressure, and a cut-out cock for controlling communication through which fluid is supplied to said vent valve device and communication from the brake pipe to said emergency valve device.

10. In a fluid pressure brake, the combination with a valve device for controlling the brakes, of a main volume chamber associated with said valve device, an additional volume chamber separated from the main volume chamber by a partition and having an outer wall provided with a threaded opening, and a threaded plug normally having screw-threaded engagement in an opening in said partition and adapted to be transferred to the threaded opening in said outer wall to thereby confine the volumes of said chambers.

In testimony whereof I have hereunto set my hand.

CLYDE C. FARMER.